United States Patent
Ku et al.

(10) Patent No.: US 8,767,589 B2
(45) Date of Patent: Jul. 1, 2014

(54) METHOD AND APPARATUS FOR PROVIDING PRIVACY FOR A TELEPHONE NUMBER IN A NETWORK

(75) Inventors: Bernard Ku, Austin, TX (US); Armstrong Soo, San Ramon, CA (US); Douglas Lin, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1015 days.

(21) Appl. No.: 12/256,297

(22) Filed: Oct. 22, 2008

(65) Prior Publication Data
US 2010/0098234 A1 Apr. 22, 2010

(51) Int. Cl.
*H04L 12/16* (2006.01)

(52) U.S. Cl.
USPC ........... 370/259; 370/493; 379/161; 455/415; 455/417

(58) Field of Classification Search
None
See application file for complete search history.

(56) References Cited

U.S. PATENT DOCUMENTS

| | | | |
|---|---|---|---|
| 7,965,699 B1* | 6/2011 | Accardi et al. | 370/351 |
| 2006/0072575 A1* | 4/2006 | Miyajima et al. | 370/392 |
| 2007/0121863 A1* | 5/2007 | Nagel et al. | 379/161 |
| 2008/0194255 A1* | 8/2008 | Walker et al. | 455/433 |

OTHER PUBLICATIONS

Stastny et al., "IANA Registration for Enumservice VOID", ENUM Internet-Draft, May 9, 2005.*

* cited by examiner

*Primary Examiner* — Khoa Huynh

(57) ABSTRACT

A method and an apparatus for providing privacy for a telephone number in a network are disclosed. The method receives a call associated with a disposable telephone number, and determines a call processing feature for the disposable phone number in accordance with a filtering function. The method then processes the call in accordance with the call processing feature for the disposable phone number.

18 Claims, 4 Drawing Sheets

US 8,767,589 B2

METHOD AND APPARATUS FOR PROVIDING PRIVACY FOR A TELEPHONE NUMBER IN A NETWORK

The present invention relates generally to communication networks and, more particularly, to a method and apparatus for providing privacy for a telephone number in a network, e.g., an Internet Protocol (IP) network, a Voice over Internet Protocol (VoIP) network, and the like.

BACKGROUND OF THE INVENTION

A customer may wish to protect the privacy of his/her telephone number while accessing network based services, e.g., Voice over Internet Protocol (VoIP) services. For example, a customer may subscribe to a VoIP service but may not wish to share his/her telephone number with all callers. For example, once the customer's number is made known, undesirable callers (e.g., advertisers) may direct calls to the customer.

SUMMARY OF THE INVENTION

In one embodiment, the present invention discloses a method and an apparatus for providing privacy for a telephone number in a network. The method receives a call associated with a disposable telephone number, and determines a call processing feature for the disposable phone number in accordance with a filtering function. The method then processes the call in accordance with the call processing feature for the disposable phone number.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing privacy for a telephone number in a network. Although the present invention is discussed below in the context of Internet Protocol (IP) Multimedia Subsystem (IMS) networks, the present invention is not so limited. Namely, the present invention can be applied to packet networks in general, e.g., Voice over Internet Protocol (VoIP) networks, Service over Internet Protocol (SoIP) networks, and the like.

Figure 1:
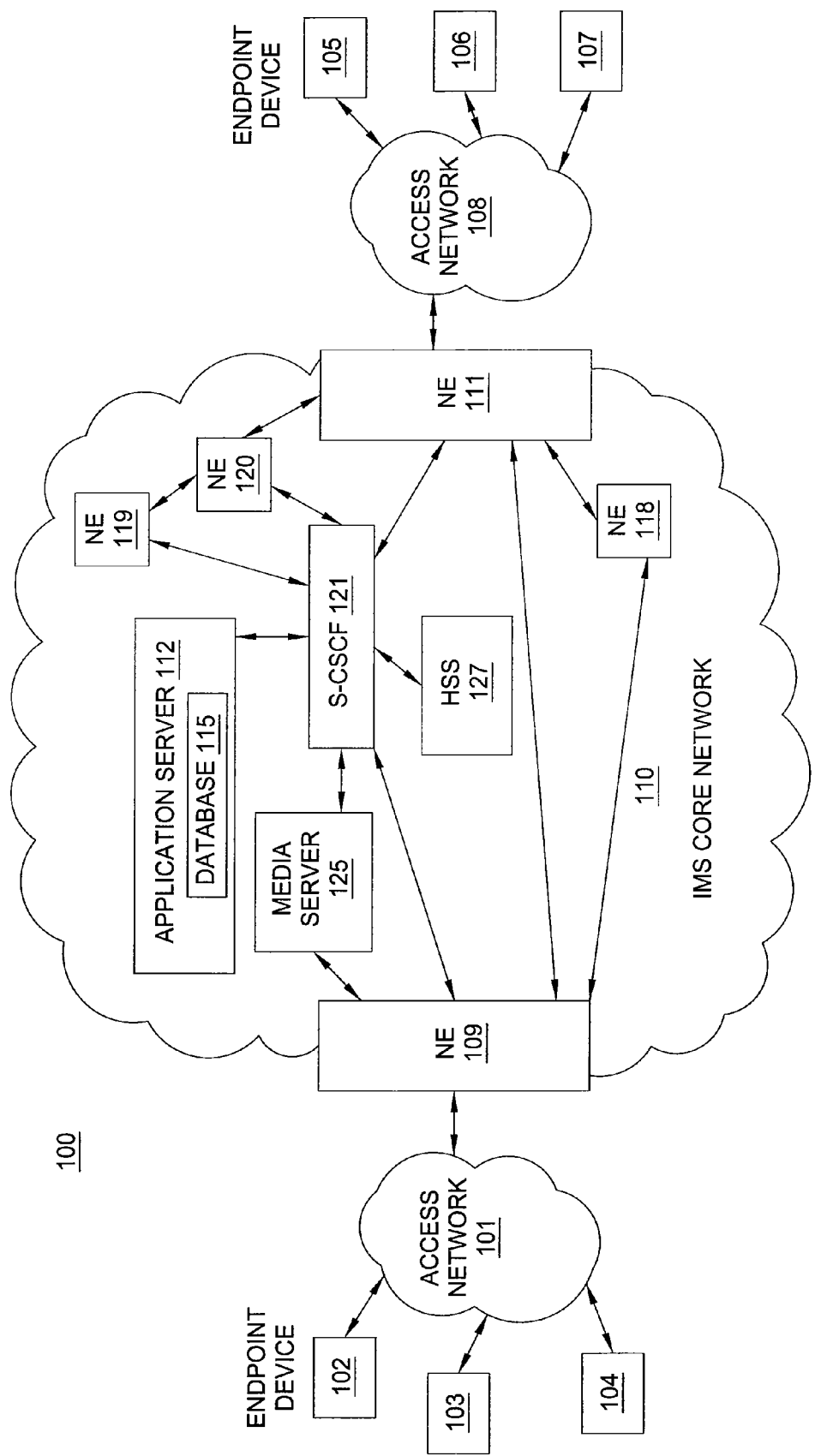
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice and data services are transmitted on IP Multimedia Subsystem (IMS) networks. However, a customer may wish to protect the privacy of his/her telephone number while accessing IMS network based services, e.g., VoIP services and any other services. For example, a customer may subscribe to a VoIP service but may not wish to share his/her telephone number with all callers. In one embodiment, the customer may then request to create a personal and disposable telephone number.

In one example, the customer may wish to create a number for communicating with members of a social network, e.g., members of a dating site. In another example, the telephone number may be for a specific temporary need, e.g., for participating in an auction for buying/selling goods such as on an online auction site. In another example, the customer may wish to create a personal and disposable number for new acquaintances, for chat rooms, etc.

One method for providing the customer with a disposable phone number is simply to assign the customer with an extra phone number as a disposable phone number and linking the disposable phone number to the customer's regular phone number. This service model enables the customer to keep the regular phone number private. However, if the disposable phone number is distributed to undesirable callers (e.g., advertisers), the customer may receive unwanted calls. The customer may then be dissatisfied with the service. In addition, the customer may incur cost for the unwanted calls. For example, a customer using a cellular phone pays for a call regardless of who originated the call, e.g., in terms of using up allotted air time associated with the customer.

In one embodiment, the current method provides privacy of the customer's telephone number while enabling the customer to access other value-added services. Specifically, the method provides the customer with a personal and disposable telephone number with an inbound call filtering feature or function. In order to more clearly describe the current invention, the following networking terminologies are first provided.

E.164; and

ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet Domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

An ENUM server may then be queried by the S-CSCF to resolve on the domain name 4.3.2.1.5.5.5.7.8.9.1.e164.arpa. For example, an IP Multimedia Subsystem (IMS) network may use an ENUM server to resolve phone number that is in E.164 format, i.e. the contact information of the phone number. The S-CSCF may then query a DNS for the regular routing of the contact information resided in the NAPTR (Naming Authority Pointer) resource records, e.g. the SIP URI. In sum, the S-CSCF will send the ENUM query and the ENUM server will return the NAPTR resource records if the E164 number is registered, where the S-CSCF then queries the DNS for the destination of the returned records, e.g., the SIP URI.

It should be noted that the customer may have a set of NAPTR resource records. For example, the customer may have a SIP address, a telephone number, a presence service number, an email address, etc. The query may then retrieve the set of NAPTR resource records for the customer. Table 1 below provides an illustrative example of a query and a response for the above phone number.

TABLE 1

| An example of ENUM query and response | | |
|---|---|---|
| Query | ORIGIN 4.3.2.1.5.5.5.7.8.9.1.e164.arpa | |
| Response | IN NAPTR 100 10 "u" | Active |
| | "E2U+SIP" "!^.*$!sip:user@example.com!" | |
| | IN NAPTR 100 20 "u" | Active |
| | "E2U+pres" "!^.*$!pres:user@example.com!" | |
| | IN NAPTR 100 30 "u" | Inactive |
| | "E2U+mailto" "!^.*$!mailto:user@example.com!" | |

It should be noted that Table 1 above illustrates a response having a plurality of NAPTR resource records. In this illustrative example, each NAPTR resource record contains information pertaining to an order (e.g., represented by the value "100") followed by a preference (e.g., represented by the values "10", "20", and "30"). In one embodiment, the NAPTR resource records are organized based on the order field and the preference field, e.g., from a lowest order value to a highest order value and from a lowest preference value to a highest preference value. For example, in operation, the lowest value (e.g., "10" in this example) in the preference field will be executed first and then followed by the next lowest preference field (e.g., "20" in this example), and so on. This approach allows a call to be directed to a plurality of possible destinations based upon a preferred order or sequence that can be selectively set by the user.

Furthermore, in one embodiment, each NAPTR resource record may also have an activation field that indicates whether a NAPTR resource record is "active" or "inactive." An "active" field indicates that the NAPTR resource record can be used, whereas an "inactive" field indicates that the NAPTR resource record should not be used. Again, this approach allows a user to selectively activate or deactivate a NAPTR resource record. For example, a user may be travelling on a business trip for an extended period of time and does not want calls directed to the user's home number while the user is travelling. As such, the user can selectively designate a NAPTR resource record associated with the user's home number to be "inactive", during the business trip. Upon return from the business trip, the user can selectively designate the NAPTR resource record associated with the user's home number to be "active" again.

Figure 2:
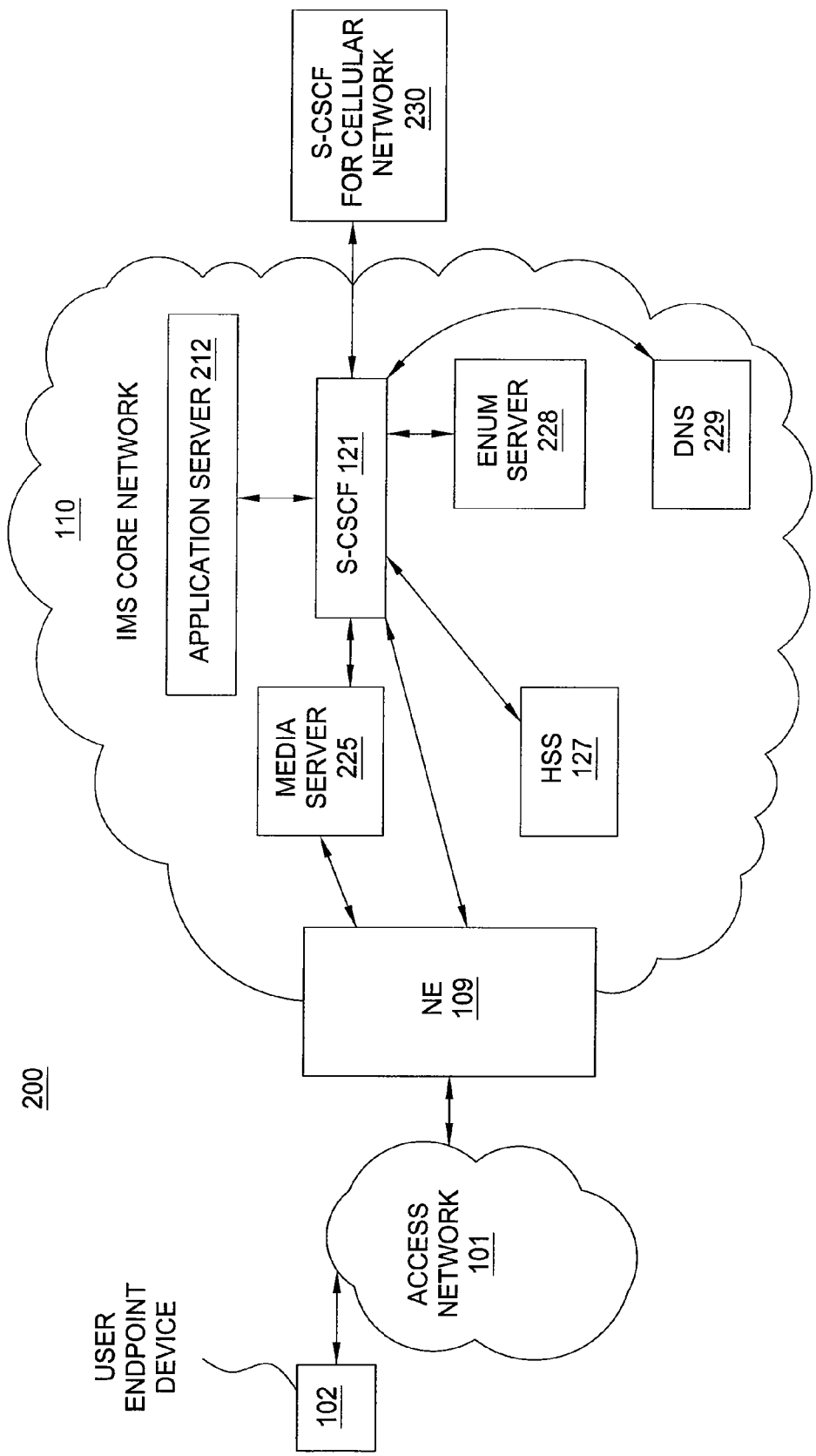
FIG. 2 illustrates an exemplary network in accordance with one embodiment of the current invention for providing privacy for a telephone number.

FIG. 2 illustrates an exemplary network 200 in accordance with one embodiment of the current invention for providing privacy for a telephone number. In one embodiment, the network 200 comprises a User Endpoint (UE) device 102 communicating with an IMS network 110 via an access network 101. The IMS network 110 comprises an HSS 127, a S-CSCF 121, an ENUM server 228, a DNS 229, an application server 212 and an MS 225 interconnected for providing VoIP services to customers.

The current method provides privacy for customer telephone numbers by providing the customer with a personal and disposable telephone number with a feature or function for filtering inbound calls. The method first enables the customer to subscribe to a service and to register a disposable telephone number at a Home Subscriber Server (HSS) 127 located in the IMS network 110. The customer may register for a disposable phone number, preferences for filtering the inbound calls directed to the disposable phone number, one or more devices to be rung when a call is received, customized announcements to be played to callers, and the like.

The method may then implement filtering of inbound calls destined to a disposable telephone number in the application server 212. In one embodiment, the application server 212 may provide execution logic for calls destined to a disposable telephone number that filters inbound calls based on the identity of the caller. For example, a caller ID (identification) feature may be used in conjunction with the disposable telephone number to block calls from a predetermined list of callers. For example, the customer may provide a list of possible callers from whom the customer prefers not to receive a call. Likewise, the customer may provide a list of possible callers from whom the customer prefers to receive a call, e.g., those serious buyers or callers whom the customer wants to pursue a more serious relationship.

In another embodiment, the application server 212 may provide execution logic for calls destined to a disposable telephone number that filters calls based on a caller's response to one or more queries. For example, the customer may provide a prerecorded announcement to be played to all callers to the disposable phone number via the Media Server (MS) 225. The announcement may request an input from the caller that identifies the purpose of the call. The caller may then enter a response to the request/query via an Interactive Voice Response (IVR) system, telephone keypad, etc. Once the purpose of the call is determined, the call may then be handled based on the response. For example, if the customer is selling a car, the customer may have a preference indicating that calls regarding the car are to be forwarded to the customer's cell phone number, while other calls are to be forwarded to a voice mail. The execution logic in the application server 212 may then be based on the response from the caller to the request announced via the IVR system in MS 225. For example, the IVR system may present the caller with the following selections: 1) "Please press one if this call is a personal call", 2) "Please press two if this call is a work related call", 3) "Please press three if this call relates to a car offered for sale". If the caller selects the third option, then the call will be immediately forwarded to the customer's cell phone number. Selection of the other two options can be handled according to the customer's preference, e.g., selection of the second option will forward the call to a business phone number of the customer, whereas selection of the first option will forward the call to a home phone number of the customer, and so on.

In one embodiment of the present invention, when the Serving-Call Session Control Function (S-CSCF) 121 receives a call for an E.164 phone number, it will query the HSS 127 to determine whether the call is associated with a disposable phone number. S-CSCF 121 then queries the ENUM server 228 for the contact information of the phone number. If the E164 number is registered, then the ENUM server 228 will be able to retrieve the associated NAPTR resource records.

If the call is associated with a disposable phone number, the ENUM server 228 marks the one or more NAPTR resource records with a flag that indicates the returned one or more Uniform Resource Identifiers (URIs) are to be processed in accordance with call processing features and procedures for a disposable phone number. Otherwise, the one or more NAPTR resource records are not marked with a flag. The ENUM server 228 then returns the NAPTR resource records to the S-CSCF 121.

If the returned one or more NAPTR resource records include the flag, the S-CSCF 121 then queries the application server 212 for execution logic for the call destined to the disposable phone number. The execution logic may then be determined based on the customer's preference for filtering inbound calls. The application server 212 provides the execution logic to the S-CSCF 121. Active and inactive NAPTR records can be resided in the ENUM server 228 according to the caller identity or the preference of the customer. Only the active NAPTR resource records will be processed according to the application logic and returned to the S-CSCF for further call processing/routing.

The S-CSCF 121 may then query the DNS 229 for routing information of the call in accordance with the execution logic received from the application server 212. In one example, the execution logic may indicate that the call is to be forwarded to the customer's cell phone. The S-CSCF 121 may then send a SIP invite message towards the customer's cell phone via an S-CSCF for the cellular network 230. In one example, the S-CSCF will use the combined [order, preference] field, e.g., [100, 10] in the above example, to implement the first end point to be reached, if the first preferred device is not available, then the S-CSCF will scan the next one in the combined [order, preference] field, e.g., [100, 20]. In one example, the execution logic may indicate that the call is to be blocked. The S-CSCF 121 may then notify the caller that the called party is not available and terminate the call, and so on. In one example, the S-CSCF may direct the media server 225 to play a customized announcement, e.g., informing any potential buyer that advertised merchandise is no longer available.

In one embodiment, the customer may use the same service provider for both the VoIP service and the cellular service. In that case, one S-CSCF may provide both services and thus the same S-CSCF may forward the above call towards the customer's cell phone. For example, the S-CSCFs 121 and 230 may be in one system and/or in one network without any loss of generality.

Figure 3:
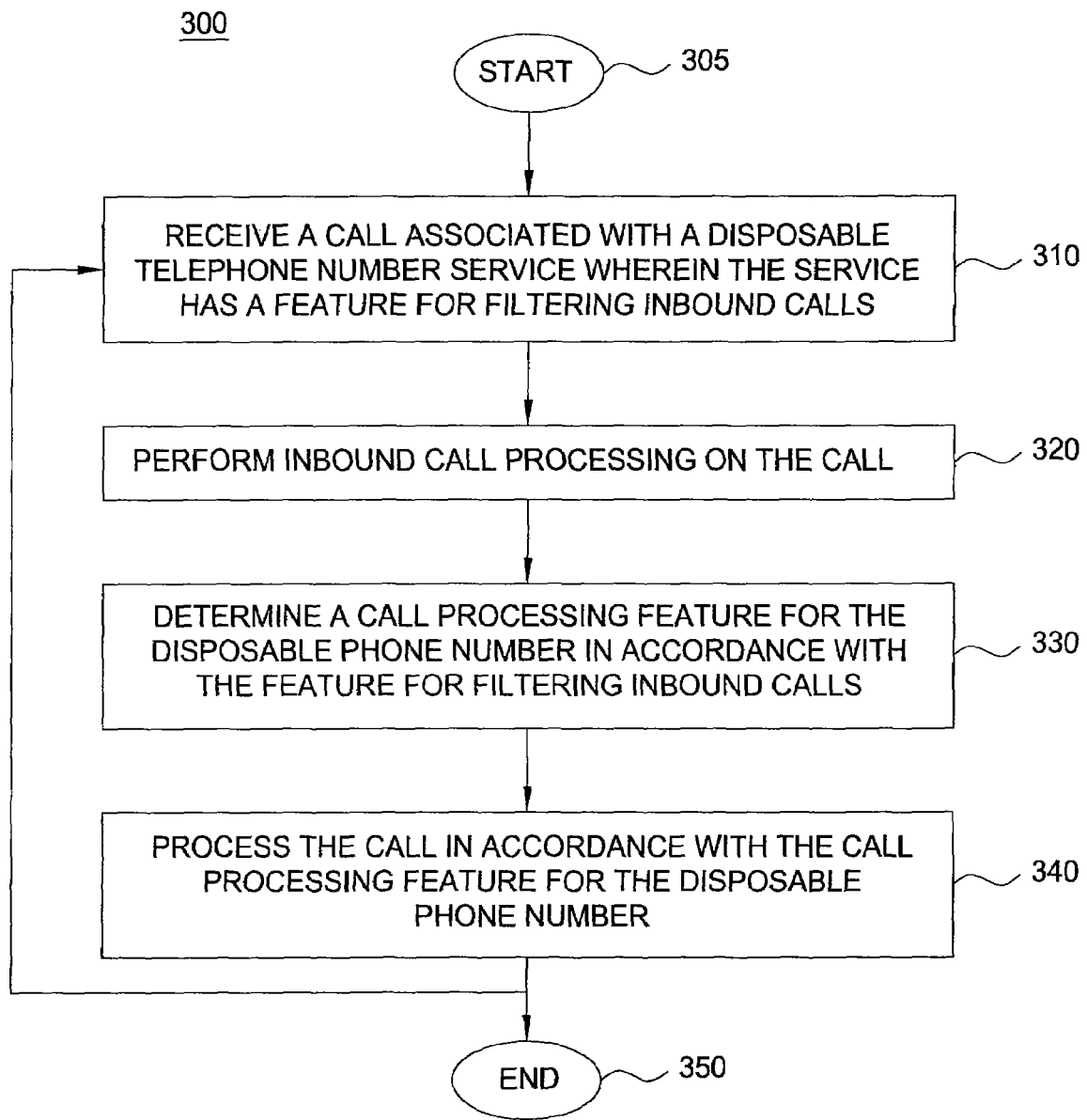
FIG. 3 illustrates a flowchart of a method for providing privacy for a telephone number in a network.

FIG. 3 illustrates a flowchart of a method 300 for providing privacy for a telephone number in a network. The current method provides privacy for customer telephone numbers by providing a disposable telephone number service with a feature or function for filtering inbound calls. For example, one or more steps of method 300 can be implemented by a S-CSCF. Method 300 starts in step 305 and proceeds to step 310.

In step 310, method 300 receives a call associated with a disposable telephone number service wherein the service has a feature for filtering inbound calls. For example, a Serving-Call Session Control Function (S-CSCF) receives a call for an E.164 phone number. The S-CSCF will query the HSS to determine whether the call is associated with a disposable phone number.

In step 320, method 300 performs inbound call processing on the call. For example, the S-CSCF may query an ENUM server for resolution of the E.164 number to a URI. The ENUM server finds one or more NAPTR resource records. If the call is associated with a disposable phone number, the ENUM server may mark the one or more NAPTR resource records received from the DNS with a flag that indicates the returned one or more Uniform Resource Identifiers (URIs) are associated with a disposable phone number and are to be processed in accordance with call processing features and procedures for the disposable phone number. The ENUM server then returns only the active NAPTR resource records (with flags if the call is to a disposable phone number) to the S-CSCF.

In step 330, method 300 determines a call processing feature for the disposable phone number in accordance with the feature for filtering inbound calls. For example, if the returned one or more NAPTR resource records include the flag, the S-CSCF then queries the application server for execution logic for the call destined to the disposable phone number. For example, the execution logic may be based on the customer's preference for filtering inbound calls. The application server provides the execution logic to the S-CSCF.

In step 340, method 300 processes the call in accordance with the call processing feature for the disposable phone number. For example, the execution logic received from the application server may indicate that the call is to be forwarded to the customer's cell phone. The S-CSCF 121 may then send a SIP invite message towards the customer's cell phone via an S-CSCF for the cellular network. It should be noted that the S-CSCF will use the combined [order, preference] field to determine the first end point to be reached if a plurality of active NAPTR resource records is returned to the S-CSCF. In another example, the execution logic may indicate that the call is to be blocked or be forwarded to a voice mail system. The S-CSCF 121 may then notify the caller that the called party is not available and terminate the call or forward the call to the voice mail system. It should be noted that the inbound call can be processed in any number of methods based upon the customer's preference. The method then proceeds to step 350 to end processing the current call, or returns to step 310 to continue receiving calls.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
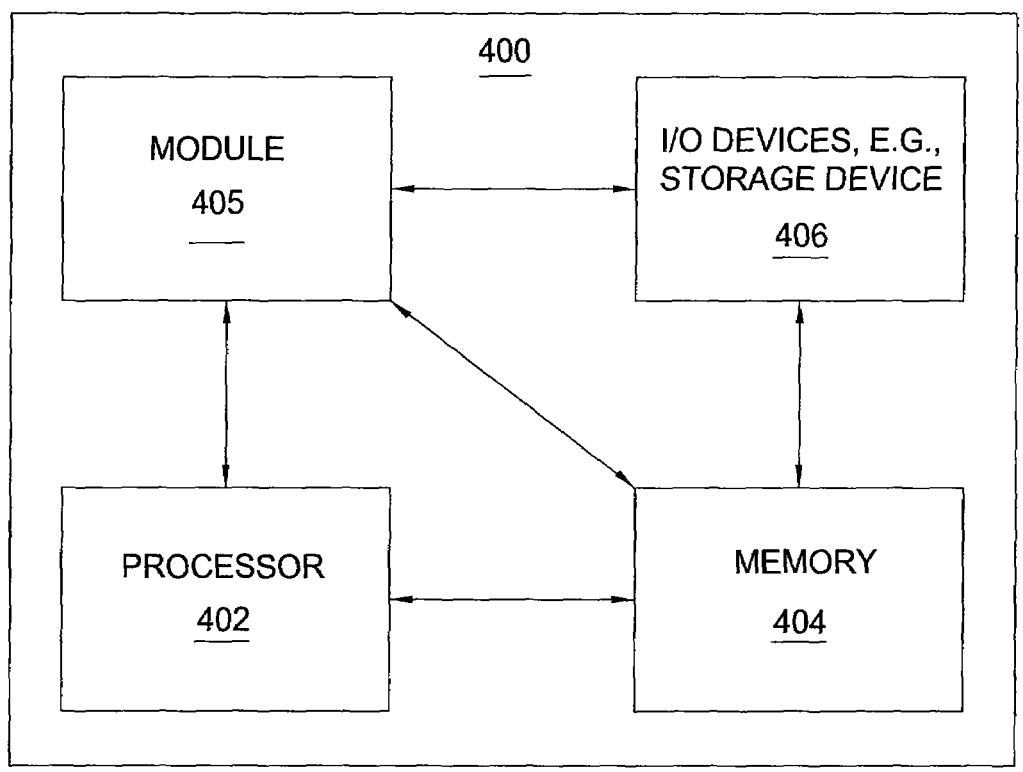
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing privacy for a telephone number in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing privacy for a telephone number in a network can be loaded into memory 404 and executed by processor 402 to implement the functions as discussed above. As such, the present method 405 for providing privacy for a telephone number in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a call processing feature for a disposable telephone number in a network, comprising:

receiving, by a processor, a call associated with the disposable telephone number;

playing, by the processor, a prerecorded announcement that includes a list of predefined purposes requesting a calling party to identify a purpose of the call;

receiving, by the processor, from the calling party a selection from the list of predefined purposes identifying the purpose of the call;

determining, by the processor, the call processing feature for the disposable telephone number in accordance with a filtering function based upon the purpose of the call entered by the calling party, wherein the filtering function is performed in accordance with a customer's preference for filtering an inbound call based upon an identity of the caller, wherein the call processing feature is determined from a flag associated with a naming authority pointer resource record that indicates the call is to be processed in accordance with the call processing feature for the disposable telephone number, wherein the naming authority pointer resource record comprises an activation field that indicates whether the naming authority pointer resource record is active indicating that the naming authority pointer resource record associated with the disposable telephone number that is assigned to a customer can be used or inactive indicating that the naming authority pointer resource record associated with the disposable telephone number that is assigned to the customer cannot be used, wherein whether the activation field is active or inactive for each naming authority pointer resource record is designated by the customer; and processing, by the processor, the call in accordance with the call processing feature for the disposable telephone number and in accordance with an order field and a preference field associated with each one of a plurality of naming authority pointer resources records assigned to the customer, wherein the order field and the preference field are set by the customer, wherein the preference field determines a preferred order of the plurality of naming authority pointer resource records for directing the call.

2. The method of claim 1, wherein the customer's preference is received when a customer registers for a service with the network.

3. The method of claim 1, wherein the customer's preference comprises a device to be rung when a call is received.

4. The method of claim 1, wherein the network is an internet protocol multimedia subsystem network.

5. The method of claim 1, wherein the customer's preference comprises a blocking of a call from a predetermined list.

6. The method of claim 1, wherein the customer's preference comprises a forwarding of a call from a predetermined list of callers.

7. A non-transitory computer-readable medium storing a plurality of instructions which, when executed by a processor, cause the processor to perform operations for providing a call processing feature for a disposable telephone number in a network, the operations comprising:

receiving a call associated with the disposable telephone number;

playing a prerecorded announcement that includes a list of predefined purposes requesting a calling party to identify a purpose of the call;

receiving from the calling party a selection from the list of predefined purposes identifying the purpose of the call;

determining the call processing feature for the disposable telephone number in accordance with a filtering function based upon the purpose of the call entered by the calling party, wherein the filtering function is performed in accordance with a customer's preference for filtering an inbound call based upon an identity of the caller, wherein the call processing feature is determined from a flag associated with a naming authority pointer resource record that indicates the call is to be processed in accordance with the call processing feature for the disposable telephone number, wherein the naming authority pointer resource record comprises an activation field that indicates whether the naming authority pointer resource record is active indicating that the naming authority pointer resource record associated with the disposable telephone number that is assigned to a customer can be used or inactive indicating that the naming authority pointer resource record associated with the disposable telephone number that is assigned to the customer cannot be used, wherein whether the activation field is active or inactive for each naming authority pointer resource record is designated by the customer; and processing the call in accordance with the call processing feature for the disposable telephone number and in accordance with an order field and a preference field associated with each one of a plurality of naming authority pointer resources records assigned to the customer, wherein the order field and the preference field are set by the customer, wherein the preference field determines a preferred order of the plurality of naming authority pointer resource records for directing the call.

8. The non-transitory computer-readable medium of claim 7, wherein the customer's preference is received when a customer registers for a service with the network.

9. The non-transitory computer-readable medium of claim 7, wherein the customer's preference comprises a device to be rung when a call is received.

10. The non-transitory computer-readable medium of claim 7, wherein the network is an Internet protocol multimedia subsystem network.

11. The non-transitory computer-readable medium of claim 7, wherein the customer's preference comprises a blocking of a call from a predetermined list.

12. The non-transitory computer-readable medium of claim 7, wherein the customer's preference comprises a forwarding of a call from a predetermined list of callers.

13. An apparatus for providing a call processing feature for a disposable telephone number in a network, comprising:

a processor; and a computer-readable medium storing a plurality of instructions which, when executed by the processor, cause the processor to perform operations, the operations comprising:

receiving a call associated with the disposable telephone number;

playing a prerecorded announcement that includes a list of predefined purposes requesting a calling party to identify a purpose of the call;

receiving from the calling party a selection from the list of predefined purposes identifying the purpose of the call;

determining the call processing feature for the disposable telephone number in accordance with a filtering function based upon the purpose of the call entered by the calling party, wherein the filtering function is performed in accordance with a customer's preference for filtering an inbound call based upon an identity of the caller, wherein the call processing feature is determined from a flag associated with a naming authority pointer resource record that indicates the call is to be processed in accordance with the call processing feature for the disposable telephone number, wherein the naming authority pointer resource record comprises an activation field that indicates whether the naming authority pointer resource record is active indicating that the naming authority pointer resource record associated with the disposable telephone number that is assigned to a customer can be used or inactive indicating that the naming authority pointer resource record associated with the disposable telephone number that is assigned to the customer cannot be used, wherein whether the activation field is active or inactive for each naming authority pointer resource record is designated by the customer; and processing the call in accordance with the call processing feature for the disposable telephone number and in accordance with an order field and a preference field associated with each one of a plurality of naming authority pointer resources records assigned to the customer, wherein the order field and the preference field are set by the customer, wherein the preference field determines a preferred order of the plurality of naming authority pointer resource records for directing the call.

14. The apparatus of claim 13, wherein the customer's preference is received when a customer registers for a service with the network.

15. The apparatus of claim 13, wherein the customer's preference comprises a device to be rung when a call is received.

16. The apparatus of claim 13, wherein the network is an internet protocol multimedia subsystem network.

17. The apparatus of claim 13, wherein the customer's preference comprises a blocking of a call from a predetermined list.

18. The apparatus of claim 13, wherein the customer's preference comprises a forwarding of a call from a predetermined list of callers.

\* \* \* \* \*